(12) United States Patent
Hudson et al.

(10) Patent No.: US 11,360,053 B2
(45) Date of Patent: Jun. 14, 2022

(54) SYSTEMS AND METHODS FOR IN-SITU CURE MONITORING AND DEFECT DETECTION

(71) Applicant: UNITED STATES OF AMERICA AS REPRESENTED BY THE ADMINISTRATOR OF NASA, Washington, DC (US)

(72) Inventors: Tyler B Hudson, Suffolk, VA (US); Frank L. Palmieri, Yorktown, VA (US); Trenton B. Abbott, Henderson, NC (US); Jeffrey P. Seebo, Newport News, VA (US); Eric R. Burke, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 238 days.

(21) Appl. No.: 16/700,396

(22) Filed: Dec. 2, 2019

(65) Prior Publication Data
US 2020/0173964 A1    Jun. 4, 2020

Related U.S. Application Data

(60) Provisional application No. 62/773,648, filed on Nov. 30, 2018, provisional application No. 62/831,454, filed on Apr. 9, 2019.

(51) Int. Cl.
*G01N 29/02* (2006.01)
*B29C 35/02* (2006.01)
(Continued)

(52) U.S. Cl.
CPC ......... *G01N 29/09* (2013.01); *B29C 35/0288* (2013.01); *G01N 29/02* (2013.01);
(Continued)

(58) Field of Classification Search
CPC ...... G01N 29/44; G01N 29/043; G01N 29/09; G01N 29/11; G01N 29/24; G01N 29/0645;
(Continued)

(56) References Cited

U.S. PATENT DOCUMENTS 5,453,226 A * 9/1995 Kline .................. B29C 35/0288
  264/40.1
8,511,362 B2 * 8/2013 Walczyk ............. B29C 37/0064
  156/500

(Continued)

OTHER PUBLICATIONS

Hudson, T.B, "Real-time Cure Monitoring of Composites Using a Guided wave-based System with High Temperature Piezoelectric Transducers, Fiber Bragg Gratings, and Phase-shifted Fiber Bragg Gratings." (2017). pp. 56, 112, and 194. Thesis available at http://www.lib.ncsu.edu/resolver/1840.20/34721.

*Primary Examiner* — Jacques M Saint Surin
(74) *Attorney, Agent, or Firm* — Jennifer L. Riley; Robin W. Edwards; Helen M. Galus

(57) ABSTRACT

Non-destructive evaluation (NDE) systems and methods are provided for monitoring objects being manufactured during a cure or consolidation process and for detecting defects that occur during the cure or consolidation process or to detect conditions of the process that can lead to the occurrence of defects. Information acquired by the NDE system during the cure or consolidation process can be used to adjust one or more parameters of the process in real-time to prevent defects from occurring or to reduce the number and/or severity of defects that occur during the cure or consolidation process.

20 Claims, 7 Drawing Sheets

(51) Int. Cl.
    *G01N 29/24*    (2006.01)
    *G01N 29/44*    (2006.01)
    *G01N 29/11*    (2006.01)
    *G01N 29/09*    (2006.01)

(52) U.S. Cl.
    CPC ............. *G01N 29/11* (2013.01); *G01N 29/24* (2013.01); *G01N 29/44* (2013.01)

(58) Field of Classification Search
    CPC ...... G01N 29/07; G01N 29/265; G01N 29/02; G01N 29/225; G01N 2291/0251; G01N 2291/02827; G01N 2291/0231; B29C 35/0288
    USPC .......................................................... 73/1.82
    See application file for complete search history.

(56)                    References Cited

U.S. PATENT DOCUMENTS

|  |  |  |  |
|---|---|---|---|
| 9,321,217 B2 * | 4/2016 | Jacobsen ................... | B32B 5/28 |
| 2010/0244327 A1 * | 9/2010 | Byrd ........................ | B01J 3/006 |
|  |  |  | 264/443 |
| 2012/0326347 A1 * | 12/2012 | Rose ................... | B29C 35/0288 |
|  |  |  | 264/40.1 |
| 2016/0339649 A1 * | 11/2016 | Rose ....................... | G01N 21/65 |
| 2018/0079155 A1 * | 3/2018 | Hudson ................... | B29C 70/44 |
| 2020/0061874 A1 | 2/2020 | Hudson et al. |  |
| 2020/0230899 A1 * | 7/2020 | Tyson, II .............. | B29C 70/386 |

* cited by examiner

SYSTEMS AND METHODS FOR IN-SITU CURE MONITORING AND DEFECT DETECTION

CROSS-REFERENCE TO RELATED PATENT APPLICATION(S)

This patent application claims the benefit of and priority to U.S. Provisional Patent Application Ser. No. 62/773,648, filed on Nov. 30, 2018 and titled "Automated Ultrasonic Scanning System for In-Situ Composite Cure Monitoring and Defect Detection in an Extreme Environment," and to U.S. Provisional Patent Application Ser. No. 62/831,454, filed on Apr. 9, 2019 and titled "Automated Ultrasonic Scanning System for In-Situ Composite Cure Monitoring and Defect Detection in an Extreme Environment," both of which are hereby incorporated by reference herein in their entireties.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

The invention relates to a non-destructive evaluation (NDE) system for in-situ monitoring of parts during a curing or consolidation process to detect defects in the parts.

Composite materials are being used more often in aerospace structures because of their higher strength-to-weight ratio compared to metals. With their rise in popularity, a need for a rapid and inexpensive NDE system for these parts is growing. Much of the focus of NDE lies in the detection of defects in composite materials from the manufacturing process prior to use and damage obtained during the service life of the structure.

There has been substantial prior research on cure monitoring techniques. Popular methods include dielectric analysis (DEA) and conventional bulk wave ultrasound. In addition, guided wave ultrasound using piezoelectric transducers and Fiber Bragg Gratings (FBGs) have been recently demonstrated. To date, defect detection, localization, and quantification during cure has not been previously demonstrated.

Cure monitoring with real-time defect detection during the cure process could determine when defects form and how they evolve. In addition, real-time defect detection during cure could assist validating of physics-based process models for predicting defects at all stages of the cure cycle. Real-time detection during cure could also provide information on how the temperature cycle, pressure applied, bagging scheme, and layup contribute to the formation of defects and potentially suggest mitigation techniques to avoid them. Accordingly, a need exists for a NDE system and method for monitoring the cure process and for performing defect detection during the cure process.

It would be beneficial to find defects in composite materials that occur during the manufacturing process including during the cure step. For thermoset-based advanced composite materials, defects such as porosity and fiber waviness can form during the resin cure cycle. During the curing process, an exothermic polymerization reaction of the thermoset resin takes place where dense polymer networks form to strengthen the resin and transform it into an insoluble, glassy material. It is important to ensure that the cure reaction is uniform across the composite. If it is not, these property gradients and residual stresses can cause thermal and chemical deformation such as warpage, cracking, and delamination. It is also important to allow air and volatiles to escape; otherwise, any gasses trapped in the composite create high porosity areas that decrease the strength and performance of the material.

BRIEF SUMMARY OF THE INVENTION

The present disclosure describes NDE systems and methods for monitoring objects being manufactured during the cure process and for detecting defects that occur during the cure process. The NDE systems and methods can detect conditions that occur during the cure process that can lead to the occurrence of defects.

In one feature or embodiment of the invention, information acquired by the NDE system during the cure process is used to adjust one or more parameters of the cure process in real-time to prevent defects from occurring or to reduce the number and/or severity of defects that occur during the cure process.

Another feature or embodiment of the NDE system disclosed herein enables in-situ inspection of laminates in the high-temperature (e.g., 180° C.) and/or high-pressure (e.g., 586 kPa) environments required for curing. Another feature or embodiment of the NDE system includes an ultrasonic testing (UT) scanning system that is used to acquire UT images of the part being cured during the curing process.

In accordance with one representative embodiment, a vessel of the NDE system contains the UT scanning system and is adapted for deployment inside of an industrial oven for curing out-of-autoclave (OOA) composites. A liquid nitrogen system can be installed to monitor the temperature of critical hardware within the vessel, such as the UT scanning system.

In accordance with another representative embodiment, the vessel of the NDE system is adapted for use in an autoclave, which is the chamber most often used for curing aerospace-grade thermoset composites. In accordance with one embodiment of the autoclave NDE system, the vessel of the NDE system is adapted to be resistant to high temperatures and high pressure to protect the electronics from the temperature and pressure of the autoclave.

In accordance with another representative embodiment, the UT scanning system scanner components were modified to withstand autoclave pressure, which obviated the need to adapt the vessel to be resistant to the external pressure of the autoclave (i.e., the revised UT scanning system). In another embodiment, a liquid nitrogen cooling system was redesigned to cool an 85 psig enclosure (compared to atmospheric pressure in the oven) (i.e., the revised cooling system). In yet another embodiment both the revised UT scanning system and the revised cooling system are incorporated into the NDE system. For both systems, pass throughs were designed and acquired for motor and thermocouple wires, cooling lines, and a data transfer coaxial cable.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The example embodiments are best understood from the following detailed description when read with the accompanying drawing figures. It is emphasized that the various features are not necessarily drawn to scale. In fact, the dimensions can be arbitrarily increased or decreased for clarity of discussion. Wherever applicable and practical, like reference numerals refer to like elements.

DETAILED DESCRIPTION OF THE INVENTION

Figure 1:
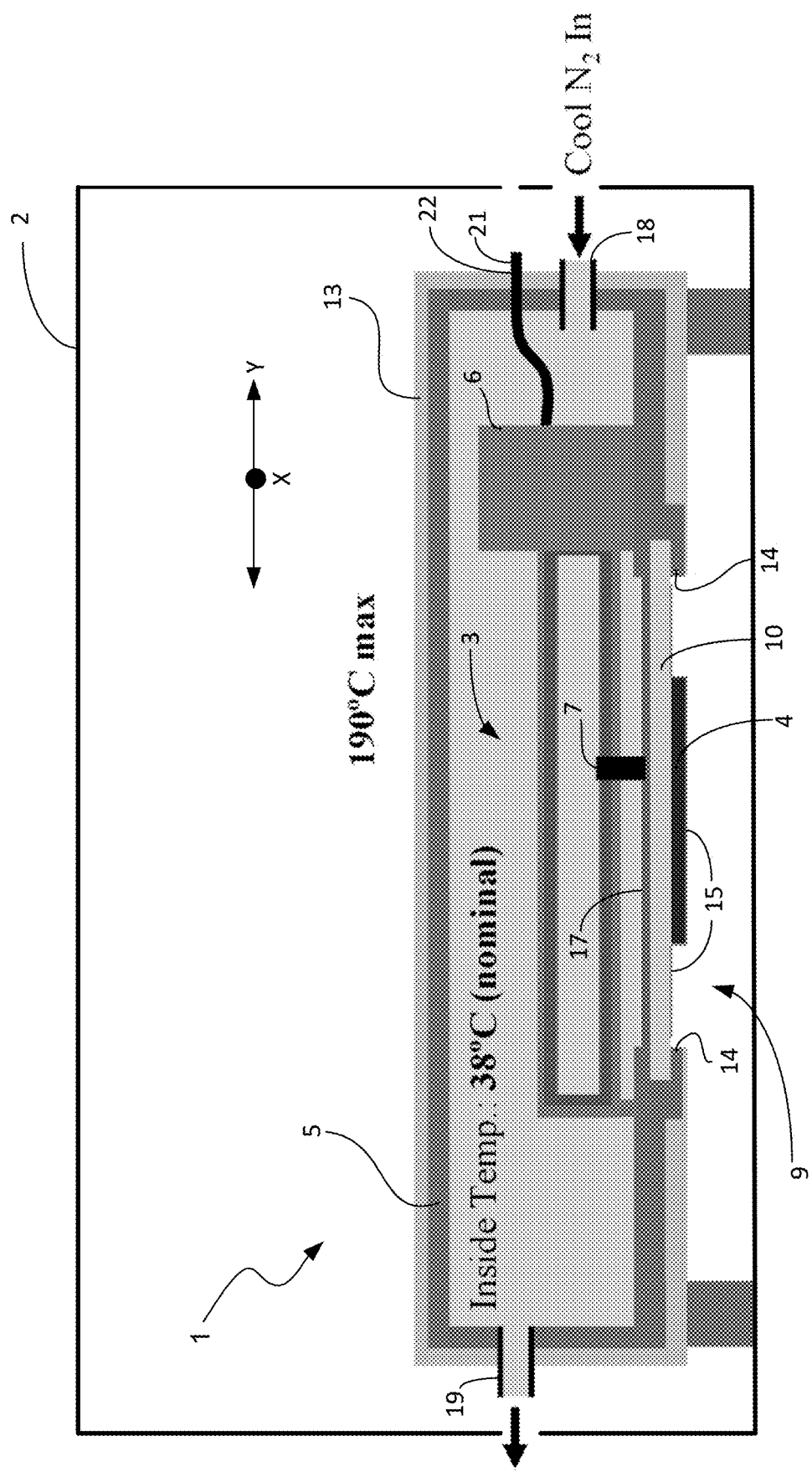
FIG. 1 is a cross-sectional side view of the vessel of the NDE system in accordance with a representative embodiment in which the vessel is designed and manufactured to be resistant to high temperatures and high pressures that are typically used during a curing process in an autoclave, for example.

In accordance with representative embodiments, NDE systems and methods are disclosed herein for monitoring objects being manufactured during the cure process and for detecting defects that occur during the cure process and/or for detecting conditions of the cure process that can lead to the occurrence of defects. In accordance with an embodiment, information acquired by the NDE system during the cure process is used to adjust one or more parameters of the cure process in real-time to prevent defects from occurring or to reduce the number and/or severity of defects that occur during the cure process.

The NDE system disclosed herein enables in-situ inspection of laminates in the high-temperature (e.g., 180° C.) and/or high-pressure (e.g., 586 kPa) environments required for curing. The NDE system includes an ultrasonic testing (UT) scanning system that is used to acquire UT images of the part being cured during the curing process. One benefit of the in-situ cure monitoring NDE system is that it provides previously unavailable data for validation of physics-based cure defect process models as well as a new understanding of how variables of the cure cycle affect final part quality. This enables improved parts to be produced with lower probability of failure. It also enables better tools and methods to be created through improved validation of models.

In accordance with a representative embodiment, a vessel of the NDE system contains the UT scanning system and is adapted for deployment inside of an industrial oven for curing out-of-autoclave (OOA) composites. A liquid nitrogen system was installed and software was written to monitor the temperature of critical hardware within the vessel, such as the UT scanning system. Experiments were performed that tested variables such as material system, ply layup, bagging scheme, and defect location and source. Numerous challenges were overcome including cooling of the interior of the vessel, coupling of the ultrasonic waves into the part, consolidation of the composite panel, and instrumentation of the NDE system. The NDE system successfully demonstrated real-time detection and localization of programmed defects as well as processing-induced porosity from caul plate mismatch in Carbon Fiber Reinforced Polymer (CFRP) panels throughout the cure cycle.

In accordance with another representative embodiment, the vessel is adapted for use in an autoclave, which is the chamber most often used for curing aerospace-grade thermoset composites. In accordance with one embodiment of the autoclave NDE system, the vessel of the NDE system is adapted to be resistant to high temperatures and high pressure to protect the electronics from the temperature and pressure of the autoclave. Modeling and testing of the NDE system were performed and it was determined that the system operated successfully and achieved a factor of safety of four on ultimate strength [required for pressure systems at NASA Langley Research Center (LaRC)].

In accordance with another representative embodiment, the UT scanning system scanner components were modified to withstand autoclave pressure, which obviated the need to adapt the vessel to be resistant to the external pressure of the autoclave. To accomplish this, the UT scanning system was disassembled to identify any pressure-sensitive components. Small holes were drilled in the sealed areas of the components to relieve pressure in these areas. Replacement motors, identical to those of the UT scanning system, were ordered and tested in the autoclave up to ~100 psig. After successful testing and modifications to the UT scanning system, a liquid nitrogen cooling system was redesigned to cool an 85 psig enclosure (compared to atmospheric pressure in the oven). The revised UT scanning system and the revised cooling system were tested and passed quality and safety requirements. For both systems, pass throughs were designed and acquired for motor and thermocouple wires, cooling lines, and a data transfer coaxial cable.

A few representative embodiments of the NDE system and method will now be described with reference to FIGS. 1-7, in which like reference numerals represent like components, elements or features. It should be noted that features, elements or components in the figures are not intended to be drawn to scale, emphasis being placed instead on demonstrating inventive principles and concepts. Hence, specific dimensions and other physical characteristics relating to the embodiments disclosed herein are not to be considered as limiting, unless the claims expressly state otherwise. It should be noted that the inventive principles and concepts are not limited to the representative embodiments described herein, as will be understood by those of skill in the art in view of the description provided herein.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present disclosure as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. The term "approximately" means to within an acceptable limit or amount to one of ordinary skill in the art.

The terms "memory," "memory device" or "memory system," as those terms are used herein, are intended to denote a non-transitory computer-readable storage medium that is capable of storing computer instructions, or computer code, for execution by one or more processors. References herein to "memory," "memory device" or "memory system," should be interpreted as one or more memories, memory devices or memory systems. The memory can, for example, be multiple memories within the same computer system. The memory can also be multiple memories distributed amongst multiple computer systems or computing devices.

A "processor," "processing device," or "processing logic," as those terms are used herein, are interchangeable and encompass at least one electronic device that is configured to perform one or more processing algorithms that process signals. The electronic device(s) can perform the algorithm(s) in hardware, software or firmware, or a combination thereof. References herein to a system comprising "a processor" or "a processing device" or "processing logic" should be interpreted as one or more processors or processing cores. The processor can, for instance, be a multi-core processor. A processor can also refer to a collection of processors within a single computer system or distributed amongst multiple computer systems. Instructions of a computer program can be performed by a single processor or by multiple processors that can be within the same device or that can be distributed across multiple devices. The term "controller," as that term is used herein, denotes an electronic device that comprises a processor, a processing device or processing logic, as those terms are defined herein.

The terms "curing process" or "cure process," as those terms are used herein, are intended to denote both cure and consolidation processes. For thermoplastic resins, there is no reactive cure process, and therefore it is different from a thermoset (e.g., epoxy) resin cure process. For a thermoplastic material (e.g., Nylon, polyarylene ethers, poly phenylene sulfphone, etc.), the polymer is already fully "cured," meaning it is at its maximum molecular weight before the laminate is fabricated. The thermoplastic resin is combined with reinforcing fibers to make prepreg tape or fabric, which is then stacked to make a laminate preform. The plies in the preform are not held together by anything before consolidation. During consolidation, the preform is heated and pressed, at a temperature that is sufficiently high to melt the crystalline portions of the polymer and allow the material to flow and diffuse. The pressure on the preform closes voids in the laminate and allows the plies of molten resin to come in contact. The laminate is then cooled before releasing the pressure to lock in the consolidate form, causing the individual plies of the laminate stack to exist as a single, monolithic piece of resin with reinforcing fibers. Thus, the consolidation process is completely physical: melting, mixing, removal of voids, and cooling, whereas the reactive cure process is physical and chemical: melting, mixing, removal of voids, cure reaction, and cooling. The term "curing process" or "cure process," as used herein denote both the reactive cure process and the physical consolidation process. The NDE system described herein is suitable for monitoring and detecting defect in both types of processes and material types.

FIG. 1 is a cross-sectional side view of the vessel 1 of the NDE system in accordance with a representative embodiment in which the vessel 1 is designed and manufactured to be resistant to high temperatures that are typically used during a curing process in an autoclave or oven, for example. The vessel 1 can be designed to resist the autoclave environment or it can be unsealed such that it is at the same pressure as the autoclave, provided that the electronics are capable of operating at autoclave pressure, as will be described below in more detail. The vessel 1 is designed and manufactured to be placed inside of a chamber 2 in which parts are cured, such as, for example, an autoclave or an oven. A UT scanning system 3 within the vessel 1 is able to monitor the curing process during which a part 4 is being cured and to detect defects in the part 4 as they occur during the curing process. The part 4 can comprise, for example, a carbon fiber reinforced thermoset resin, although the inventive principles and concepts are not limited with respect to the materials comprising the part 4 to be cured and monitored.

In accordance with this representative embodiment, a frame 5 of the vessel 1 is made of a hard material, such as a metal (e.g., aluminium or steel) that is resistant to high temperatures and high pressure. The material of which the frame 5 is made will depend on the chamber 2 and the conditions inside of the chamber 2 during the curing process. For example, in embodiments where the chamber 2 is an autoclave, the environment of the chamber 2 reaches pressures of about 586 kPa and temperatures of around 191° Celsius (C.). In embodiments where the chamber 2 is an oven, high temperatures are reached inside of the oven, but the pressure can remain relatively low. The frame 5 is designed according to the conditions that it will be required to withstand inside of the chamber 2. It should be noted that the vessel 1 and the NDE system in which it is incorporated are not limited to being used with any particular type of chamber 2. For exemplary purposes, the chamber 2 is described herein as an oven or autoclave because those are the types of chambers 2 that are most often used for the curing process.

The frame 5 has an open area inside of it in which the UT scanning system 3 is mounted. The UT scanning system 3 comprises an X-Y raster scanner 6 and a transducer 7 that is moved by the X-Y raster scanner 6 in X- and Y-directions of an X, Y, Z-Cartesian coordinate system. The X-Y raster scanner could also be modified to include other motion directions (Z-direction as well as rotation) according to the complexity of the part 4. The UT scanning system can be a commercially-available system such as, for example, a UT scanning system by Mistras Group, Inc., headquartered in Princeton, N.J. One suitable UT scanning system from Mistras Group, Inc. comprises a remote UT system having part number 1614-5115-1-2, a motorized X-Y raster scanner having part number 1622-5015-02 and a Model SRC-GS-r single-channel sensor holder for use with contact UT sensors. Of course, the inventive principles and concepts are not limited with respect to the type of UT scanning system that is used in the system 1.

The frame 5 has an opening 9 formed in a side thereof in which a mold 10 is mounted. As will be described below in more detail, the mold 10 can comprise a variety of materials and have a variety of shapes. For exemplary purposes, the mold 10 is depicted in FIG. 1 as a flat plate. The part 4 being cured is in direct contact with an outer surface of the mold 10. The mold 10 acts as an acoustic window on the surface of the vessel 1 and serves as the build plate for the part 4. The UT scanning system 3 scans through the window into the part 4 to inspect for any defects that form during the cure process and to track the movement/evolution of defects originating during layup or cure.

The material and thickness of the mold 10 depend on the application, but typically are selected to meet one or more design requirements, such as, for example: 1) low ultrasonic attenuation; 2) low thermal conductivity; 3) inert to epoxy chemistry; 4) stable at the cure temperature of interest (e.g., ~350° F. or higher); 5) mechanically stable to withstand loading in the autoclave (up to 85 psi). For example, in some cases, the material of which the mold 10 is made does not to have low thermal conductivity. Materials from which the mold 10 can be made include, but are not limited to, glass, composite, steel, aluminium and invar, which is a nickel-steel alloy with a low coefficient of thermal expansion (CTE). In accordance with the representative embodiment shown in FIG. 1, this selection was made after an evaluation of thermal conductivity models and a series of ultrasonic attenuation tests on several materials. Candidate materials for this application included soda lime glass, borosilicate glass, and lead oxide glass, but in other embodiments aluminium or steel are used. The thickness of the glass was specified to be 1" to 6" thick with an optimal thickness of 2" to 3" depending on the composition of the mold 10. The inventive principles and concepts are not limited with respect to the material that is used to make the mold 10 or with respect to the thickness of the mold 10.

In accordance with this representative embodiment, a thermally-insulating material 13 such as a porous, ceramic insulation, for example, lines the exterior of the vessel 1 to minimize heat transfer between the autoclave or oven and the interior of the vessel 1. This protects the electronics within the vessel 1 from being damaged from the high temperatures of the autoclave or oven. The thermally-insulating material 13 can instead line the inner surface of the vessel 1, i.e., it can be secured to the inner surfaces of the frame 5. The thermally-insulating material 13 is not needed in embodiments in which the electronics inside of the vessel 1 are resistant to high temperatures or in cases in which high temperatures are not used during the curing process.

In accordance with this representative embodiment, the mold 10 is secured to a lower surface of the vessel 1 by clips 14 and the part 4 to be cured is mounted to the lower surface of the mold 10 via a vacuum bag 15. A UT couplant 17 couples the head of the transducer 7 to the upper surface of the mold 10. In accordance with this representative embodiment, the interior of the vessel 1 is cooled by nitrogen that is pumped into the vessel 1 through a port 18 in the vessel 1. Hot gas leaves the interior of the vessel through a port 19. Electrical cabling 21 passes between the interior of the vessel 1 and the exterior of the vessel 1 through a port 22. It should be noted that the inventive principles and concepts are not limited with respect to the number or arrangement of ports in the vessel 1. The number and arrangement of ports will depend on a number of factors, such as, for example, the type of cooling system that is used, the type of UT scanning system 3 that is used and the electrical circuitry external to the chamber 2 that communicates with electronics on the interior of the chamber 2. The chamber 2 has ports through which the conduit for the nitrogen and the electrical cables 21 pass to the exterior of the chamber 2.

Figure 2:
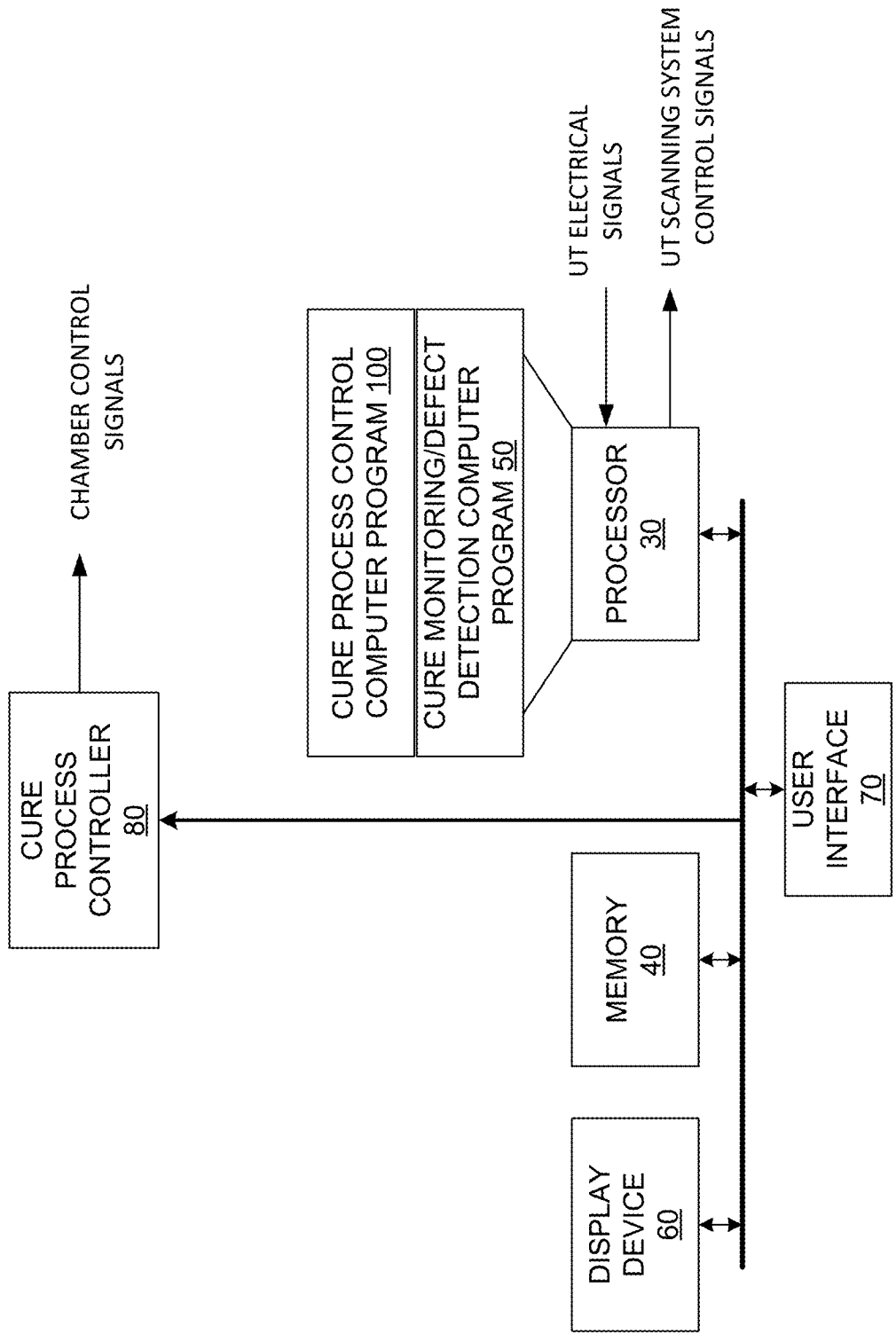
FIG. 2 is a block diagram of electrical circuitry of the NDE system in accordance with a representative embodiment for controlling the UT scanning system of the vessel shown in FIG. 1 and for processing electrical signals corresponding to UT waves reflected back from the part being cured onto the head of the transducer of the UT scanning system.

FIG. 2 is a block diagram of electrical circuitry of the NDE system in accordance with a representative embodiment for controlling the UT scanning system and for processing electrical signals corresponding to UT waves reflected back from the part 4 onto the head of the transducer 7. Because it is known how UT scanning systems acquire UT signals, a detailed discussion of the acquisition process is not provided herein in the interest of brevity. The acquisition process is generally as follows. The transducer 7 sends ultrasonic waves through the mold 10 and into the material comprising the part 4. When the ultrasonic wave encounters a boundary between two media (e.g., composite-mold boundary, composite-air boundary) or a defect in the material comprising the part 4, the wave is partially reflected back to the transducer head. Using the measured amplitude and time of flight of returned waves, the size and location of the defects (e.g., voids) in the material comprising the part 4 can be determined. The transducer 7 is moved by the X-Y raster scanner 6 over the upper surface of the mold 10 in a raster scan motion, causing the UT signals to pass through the mold 10 and into the part 4. The UT waves reflected from within the part are converted into electrical signals, which are then processed to create a map, or b-scan/c-scan image(s), of the part 4 with any defects or material property changes highlighted using the reflected waves.

With reference to FIG. 2, the electrical signals generated by the transducer 7 corresponding to the reflected UT waves are input to a processor 30 of the NDE system. Depending on the UT scanning system used, some conditioning of the electrical signals can be performed (e.g., amplification, analog-to-digital conversion, filtering, etc.) prior to the corresponding electrical digital signals being inputted to the processor 30. The electrical digital signals can be stored in a memory 40 and read from the memory 40 by the processor 30. The processor 30 runs a monitoring and defect detection algorithm 50 that generates maps, such as a-scan, b-scan and/or c-scan maps and detects defects. The NDE system typically includes a display device 60 on which the processor 30 causes the maps to be displayed for visualization by a user. For example, a system operator operating the chamber 2 (e.g., an autoclave) can cause one or more conditions or parameters of the curing process to be adjusted based on observations of maps displayed on the display device 60 by entering commands via a user interface (UI) 70 of the NDE system. Those commands are then sent to a controller 80 of the chamber 2 that adjusts one or more conditions of the chamber 2.

For example, observations by the system operator of maps displayed on the display device 60 can cause the user to send commands to the controller 80 that cause the controller to alter one or more conditions of the chamber 2 to thereby alter the cure process in a way that minimizes defects during cure. As an example, location and/or severity of porosity detected in the part 4 during B-stage of the cure process will lead the system operator to adjust the B-stage hold time/ temperature/pressure until the defects are minimized to acceptable levels. As another example, in a non-uniform part, localized regions can exhibit undercure or overcure, which is detected by the NDE system. Based on observations by the system operator of undercure or overcure, the system operator can send commands via the UI 70 to the controller 80 that cause the controller 80 to adjust time and/or temperature to resolve undercure and overcure issues while minimizing process time. These are examples of conditions or parameters of the chamber 2 that can be adjusted to reduce or minimize defects or to optimize the cure process so that defects do not occur.

The same types of actions that are implemented by a system operator can instead be performed automatically by the processor 30 and/or by the controller 80. In other words, the processor 30 can detect defects in real-time during the cure process and perform a process control algorithm 100 that determines adjustments, if any, that need to be made to the cure process and then sends corresponding commands to the controller 80 to cause it to adjust the conditions of the chamber 2 accordingly. It should be noted that a separate processor 30 and controller 80 are not always needed. For example, the controller 80 that controls the chamber 2 could also perform the monitoring/defect detection algorithm 50 and the process control algorithm 100. Likewise, the processor 30 could perform the operations that are typically performed by the controller 80 as well as the algorithms 50 and 100.

Figure 3:
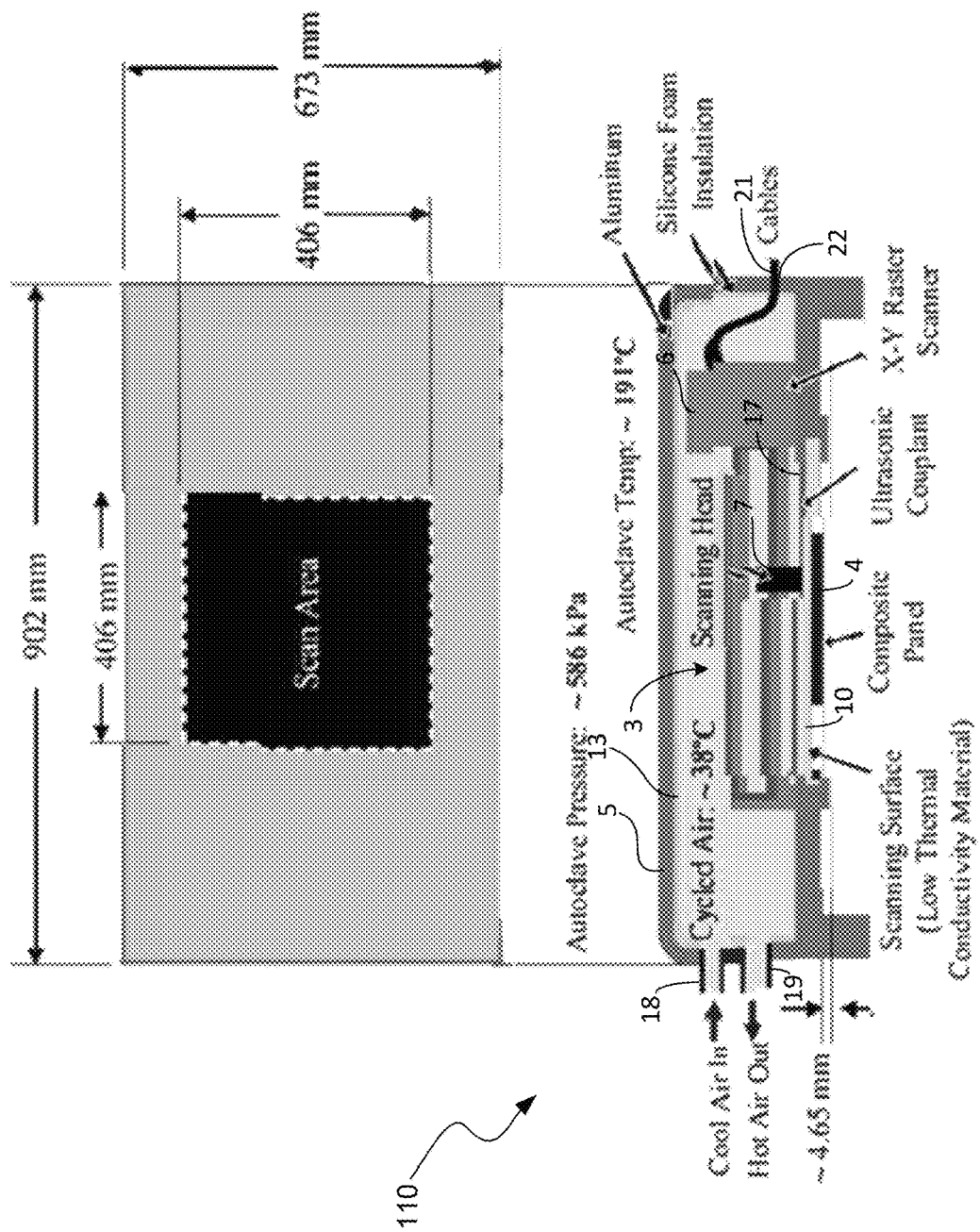
FIG. 3 is a cross-sectional side view of the vessel of the NDE system in accordance with another representative embodiment.

FIG. 3 is a cross-sectional side view of the vessel 110 of the NDE system in accordance with another representative embodiment. The vessel 110 is very similar to the vessel 1 shown in FIG. 1 except that the vessel 110 is specifically designed for use inside of an autoclave (not shown). Therefore, like reference numerals in FIGS. 1 and 3 represent the same components. Dimensions of the vessel 110 are shown in FIG. 3 for exemplary purposes, but it will be understood by those of skill in the art that the vessel 110 and the NDE system in which it is employed are not limited dimensionally. In this representative embodiment, the thermally-insulating material 13 is secured to the inner surfaces of the frame 5 and the ports 18 and 19 used for cooling the vessel 110 are located on the same side of the vessel 110. In accordance with this embodiment, the frame 5 is made of aluminium, but could be made of steel or other suitable material.

Although the vessel 110 is not limited to having any particular dimensions, the dimensions and other features shown in FIG. 3 allow the vessel 110 to fit inside of an autoclave, to have low weight, ease of set up for electrical cabling and cooling, and to be resistant to high temperatures and high pressures typically found in an autocloave used for cuing composite parts (e.g., a maximum temperature of 191° C. and a maximum pressure of 586 kPa (85 psi).

Because the mold 10 is secured to the bottom side of the vessel 1, 110 in accordance with the representative embodiments, only the bottom side of the vessel 1, 110 (i.e., the side being scanned through) needs to have low ultrasonic attenuation; therefore, the other sides of the vessel 1, 110 can be made of a different material only considering thermal insulation. It should be noted that the mold 10 can be secured to any side of the frame 5. For example, in some embodiments the mold 10 is secured to the top side of the frame 5.

Figure 4:
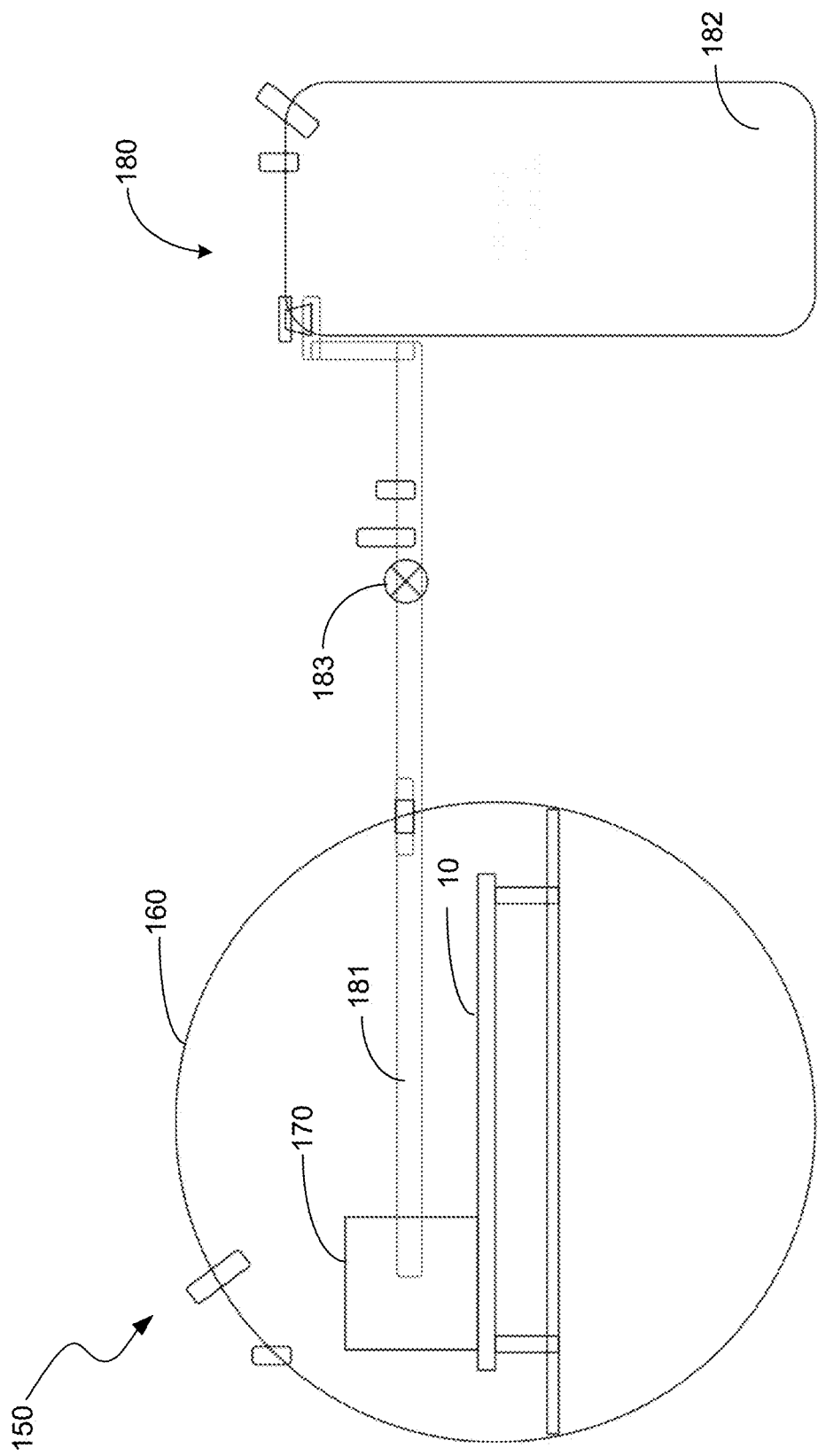
FIG. 4 is block diagram of the NDE system including the cooling system in accordance with a representative embodiment in which the UT scanning system is adapted to withstand the high pressure of an autoclave, thereby obviating the need for the vessel to be made resistant to the high pressure of the autoclave.

FIG. 4 is block diagram of a system comprising the NDE system 150, an autoclave 160 and a liquid nitrogen cooling system 180 in accordance with a representative embodiment. In accordance with this embodiment, the UT scanning system is adapted to withstand the high pressure of the autoclave 160, thereby obviating the need for the vessel 170 to be made resistant to the high pressure of the autoclave 160. The inventors determined through autoclave testing that the X-Y raster scanner of the UT scanning system could withstand the high pressure of 85 psig, and that the motors of the scanner functioned normally at this increased pressure. Holes were drilled out of sections of the scanner that were sealed with an O-ring such as the wire terminal block and aluminum motor cover to ensure the scanner would not deform due to a large pressure difference. Essentially, the scanner did not see any pressure because it was fully exposed to the high-pressure environment. However, the motors of the scanner being used were only rated up to 100° F., so it was cooled within the autoclave 160 because the ambient temperature was ramped up to 350° F. for the curing process.

The vessel 170 in which the X-Y raster scanner was housed comprised a cooling container made of a thermally-insulating material. The liquid nitrogen cooling system 180 was implemented to deliver liquid nitrogen to the vessel 170 through a hose 181 that ran through a side of the vessel 170. The hose 181 delivered LN2 from a dewar tank 182 held at about 125 psig. Since the pressure inside the autoclave 160 reached a maximum of about 85 psig, a positive pressure differential was maintained to ensure that the LN2 was delivered from the dewar tank 182 to the vessel 170 when a solenoid valve 183 was opened. A temperature controller thermocouple inside of the vessel 170 was programmed to a set point of 83° F., so that when it reached 86° F. within the vessel 170 the solenoid valve 183 opened and LN2 was delivered to the vessel 170 until it was sufficiently cooled. This ensured that the motors of the X-Y scanner never reached the critically high operating temperature of 100° F.

For this embodiment, a high-temperature 8-pin connector was attached using high temperature copper wiring to control the scanning motors in the vessel 170. The military connector ran through a bulkhead fitting in the side of the autoclave 160 and connected to the motor control box. An electrical cable from the UT transducer also ran through a bulkhead in the side of the autoclave 160 and connected to the computer of the NDE system 150 to display and record the UT data that was collected.

Figure 5:
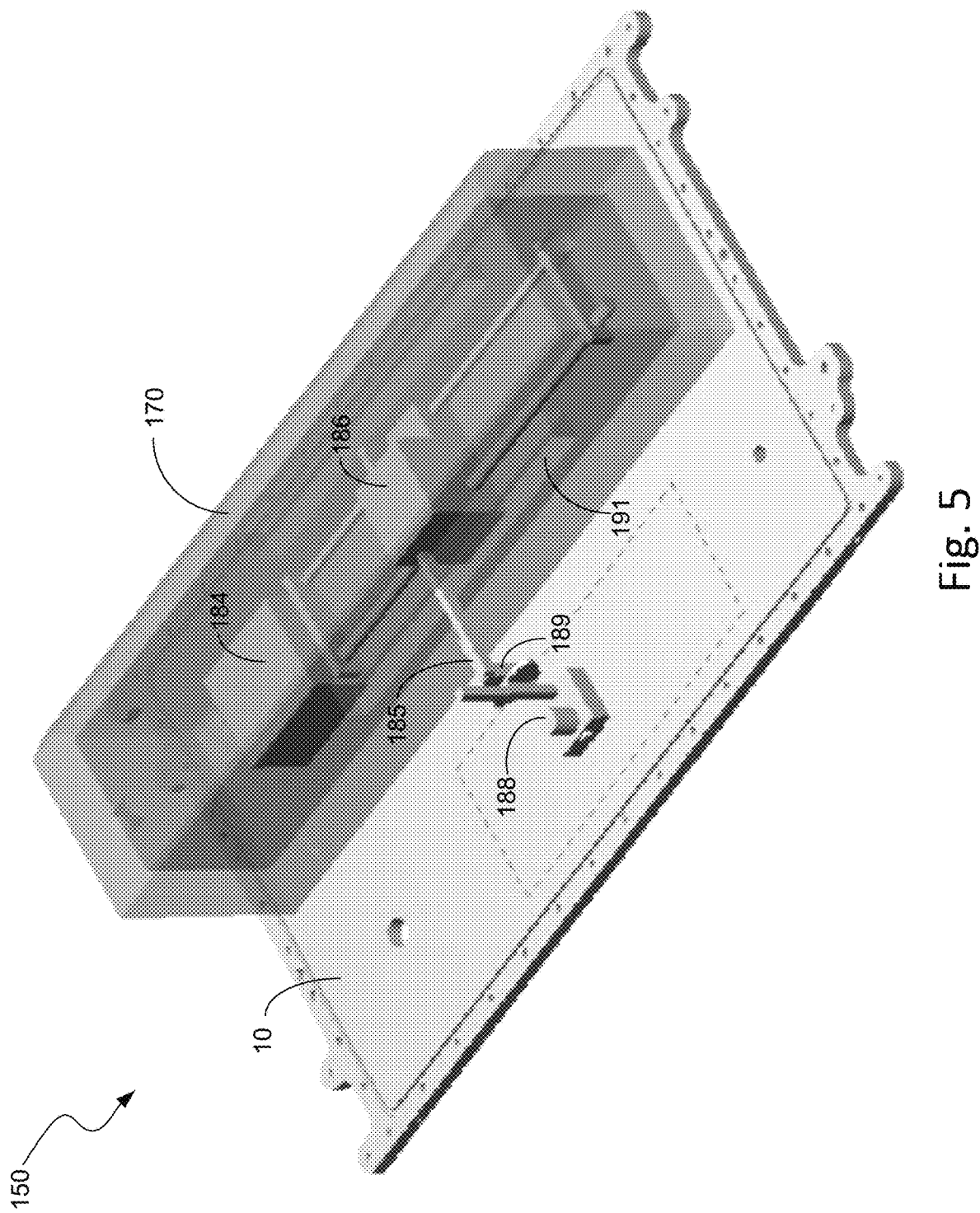
FIG. 5 is a top perspective view of the NDE system shown in FIG. 4 in accordance with a representative embodiment.
Figure 6:
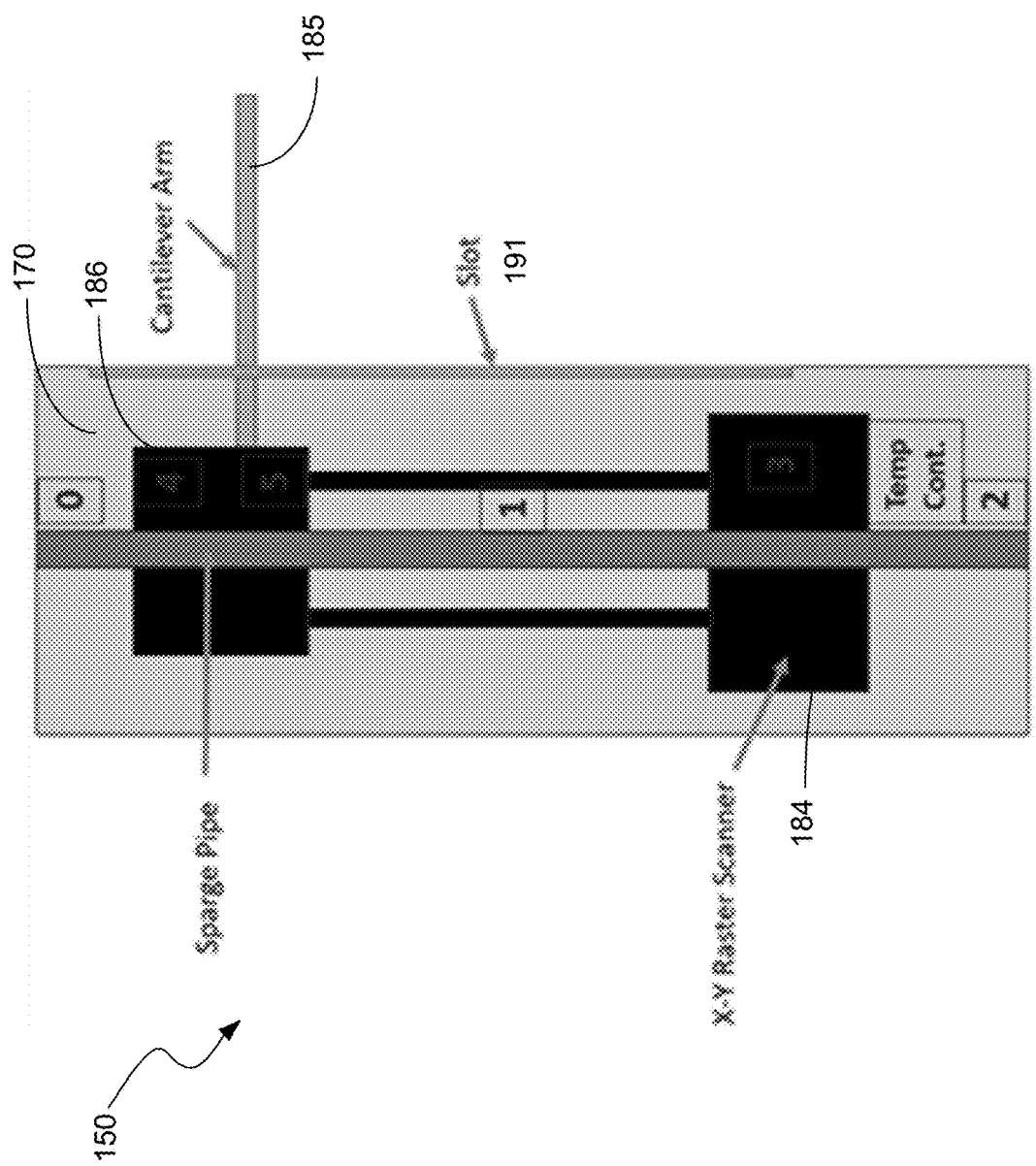
FIG. 6 is a top plan view of the NDE system shown in FIG. 5.

FIG. 5 is a top perspective view of the NDE system 150 shown in FIG. 4 in accordance with a representative embodiment. FIG. 6 is a top plan view of the NDE system 150 shown in FIG. 5. For ease of illustration, the autoclave 160 and the cooling system 180 shown in FIG. 4 are not shown in FIGS. 5 and 6. In accordance with this embodiment, components 184, 186 of the X-Y raster scanner of the UT scanning system are housed in the cooling container comprising the vessel 170, but a cantilever arm 185, a transducer attachment holder/fitting 189, and a high temperature (up to 350° F.) and high pressure (up to 85 psig) UT transducer 188 (FIG. 5) are fully exposed to the high temperature and high pressure of the autoclave in this embodiment. A high-temp electrical cable connects the UT transducer 188 to a UT processor (not shown) outside of the autoclave 160.

One of the main challenges faced in this design was how to allow the arm 185 to freely move back and forth (+/−x) and in and out (+/−y) of the vessel 170, while still keeping the vessel 170 insulated from the high temperature environment of the autoclave. This led to the development of a flexible bellow system to allow the arm 185 to move along and in and out of a slot 191 of the vessel 170.

With reference to FIG. 6, thermocouples were attached throughout the vessel 170 and multiple thermal tests were conducted to ensure that the X-Y raster scanner 184, 186 maintained a cool temperature within the vessel 170 relative to the high temperature outside of the vessel 170. One concern was that heat could be conducted along the arm 185 back into the vessel 170. Thermal testing confirmed that the LN2 cooling system 180 performed well and was able to keep the motors of the X-Y raster scanner 184, 186 below 100° F. while operating full scanning motion. This confirmed that the flexible bellow system was effective in insulating the vessel 170. Thermal testing also confirmed that heat conduction from the cantilever arm 185 to the components of scanner inside of the vessel 170, such as the gears and motors of the scanner 184, 186, was minimal and not a significant problem due to the liquid nitrogen cooling system keeping those components cool from the inside of the vessel 170.

Figure 7:
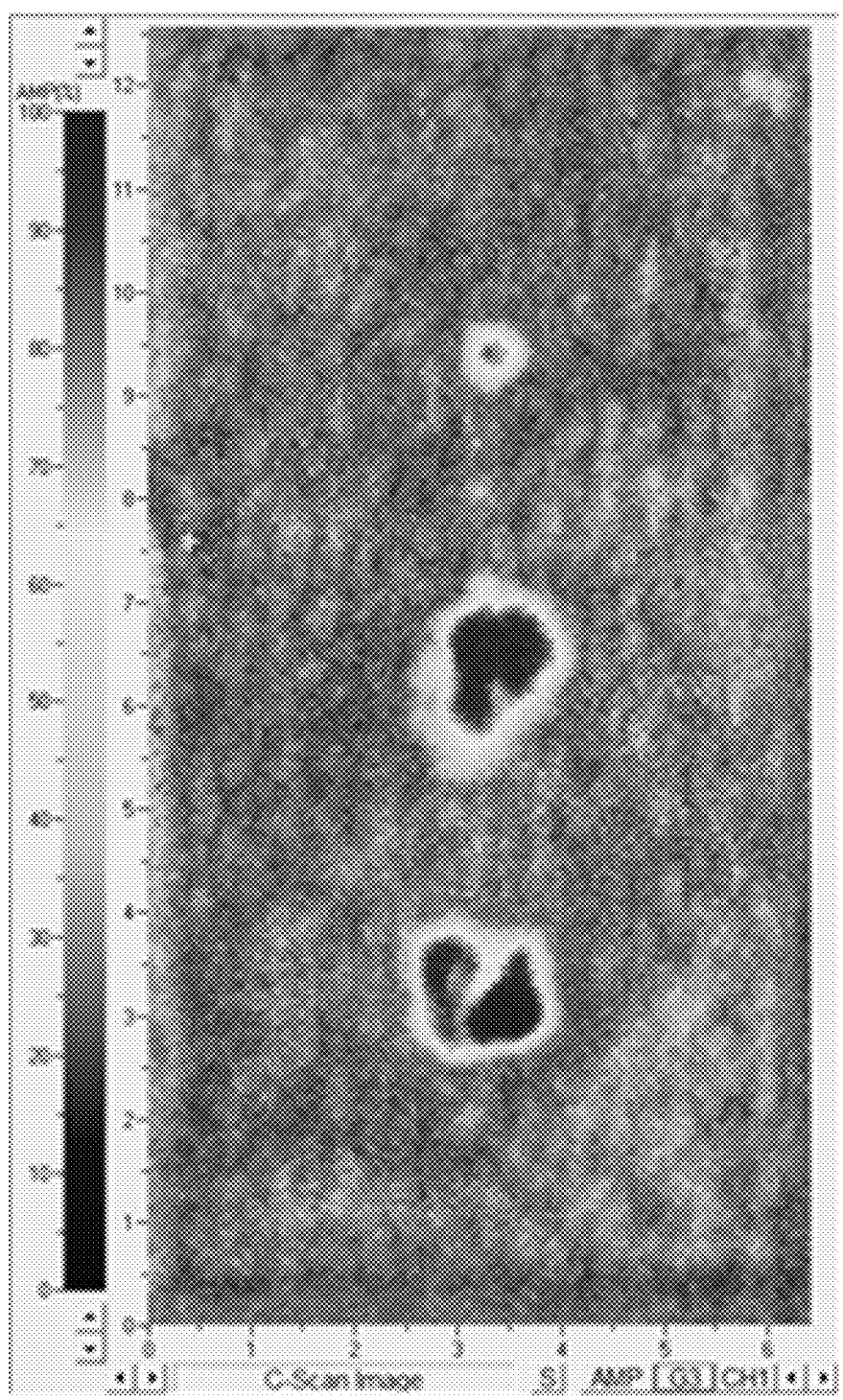
FIG. 7 is a c-scan image (top view) of porosity defects identified during cure of a composite part.

FIG. 7 is a c-scan image (top view) of porosity defects identified by the NDE system disclosed herein during cure of a composite part. Three areas of porosity are shown centered at 3 inches along the x-axis and 3 inches, 6.5 inches, and 9.5 inches along the y-axis, respectively. The three defects are located at different locations through the thickness. The through thickness location can be identified by an additional metric of the wave signal, time of flight (not shown). These three areas of porosity were detected throughout the cure cycle including at the elevated cure temperature of 350° F.

The preceding description of the disclosed embodiments is provided to enable any person skilled in the art to make or use the present invention. Various modifications to these embodiments will be readily apparent to those skilled in the art, and the generic principles defined herein can be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A non-destructive evaluation (NDE) system for in-situ monitoring of parts during a cure process to detect defects in the parts that occur during the cure process, the NDE system comprising:
    a vessel that is configured to be resistant to at least one of a high temperature and a high pressure of a chamber in which parts are cured, the vessel being configured to be placed inside of the chamber;
    an ultrasonic testing (UT) scanning system disposed inside of the vessel, the UT scanning system having a UT transducer;
    a mold secured to a side of the vessel in proximity to the UT transducer, the mold being adapted to operate as a build plate for a part to be cured such that the part to be cured is in contact with the mold or with a couplant that couples the mold with the part to be cured, the mold and the UT transducer being positioned relative to each other such that UT waves passing out of a transducer head of the UT transducer pass into a part and such that UT waves reflected from within the part pass are incident on the transducer head, the UT transducer converting the UT waves that are incident on the transducer head into UT electrical signals; and
    a processor in communication with the UT scanning system, the processor being configured to perform a cure monitoring and defect detection algorithm that processes the electrical signals to detect one or more defects occurring in the part during the cure process.

2. The NDE system of claim 1, wherein the mold comprises a material that resistant to at least one of the high temperature within the chamber and the high pressure within the chamber.

3. The NDE system of claim 2, wherein the mold is resistant to the high temperature within the chamber and the high pressure within the chamber.

4. The NDE system of claim 2, wherein the mold comprises a material selected from a group comprising glass, steel, aluminium, nickel-steel alloy, invar, and composite.

5. The NDE system of claim 1, wherein the vessel includes one or more ports for receiving cooling gas from a cooling system to control a temperature inside of the vessel.

6. The NDE system of claim 5, wherein the vessel is configured to be resistant to a high temperature within the chamber, but is not resistant to the high pressure within the chamber, the UT scanning system being adapted to be tolerant to the high pressure inside of the chamber.

7. The NDE system of claim 5, wherein the vessel is configured to be resistant to a high temperature and a high pressure within the chamber.

8. The NDE system of claim 1, wherein the processor is also in communication with a controller of the chamber and is configured to perform a cure process control algorithm that causes the processor to send one or more commands to the controller that cause the controller to adjust one or more parameters of the cure process based results obtained by the cure monitoring and defect detection algorithm.

9. The NDE system of claim 1, wherein the part being cured by the cure process comprises a thermoset-based material.

10. The NDE system of claim 1, wherein the part being cured by the cure process comprises a thermoplastic material.

11. A method for performing in-situ monitoring of parts during a cure process to detect defects in the parts that occur during the cure process, the method comprising:
with an ultrasonic testing (UT) scanning system disposed inside of a vessel, generating UT waves that pass out of a transducer head of a UT transducer of the UT scanning system pass into a part that is in contact with the mold or with a couplant that couples the mold with the part, wherein UT waves reflected from within the part are incident on the transducer head, the UT transducer converting the UT waves that are incident on the transducer head into UT electrical signals, the vessel being configured to be resistant to at least one of a high temperature and a high pressure of a chamber in which parts are cured, the vessel being configured to be placed inside of the chamber; and
with a processor in communication with the UT scanning system, performing a cure monitoring and defect detection algorithm that processes the electrical signals to detect one or more defects occurring in the part during the cure process.

12. The method of claim 11, wherein the mold comprises a material that resistant to at least one of the high temperature within the chamber and the high pressure within the chamber.

13. The method of claim 12, wherein the mold is resistant to the high temperature within the chamber and the high pressure within the chamber.

14. The method of claim 12, wherein the mold comprises a material selected from a group comprising glass, steel, aluminium, nickel-steel alloy, Invar, and composite.

15. The method of claim 11, wherein the vessel is configured to be resistant to a high temperature within the chamber, but is not resistant to the high pressure within the chamber, the UT scanning system being adapted to be tolerant to the high pressure inside of the chamber.

16. The method of claim 11, wherein the vessel is configured to be resistant to a high temperature and a high pressure within the chamber.

17. The method of claim 11, further comprising:
with the processor, performing a cure process control algorithm that causes one or more parameters of the cure process to be adjusted based on results obtained by the cure monitoring and defect detection algorithm.

18. The method of claim 11, wherein the part being cured by the cure process comprises one of a thermoset-based material and a thermoplastic material.

19. A computer program for in-situ monitoring of parts being cured during a cure process and for detecting one or more defects occurring in the parts during the cure process, the computer program comprising computer instructions for execution by a processor, the computer instructions being embodied on a non-transitory computer-readable medium, the computer instructions comprising:
a first set of computer instructions for performing a cure monitoring and defect detection algorithm that processes ultrasonic testing (UT) electrical signals to detect one or more defects occurring in the part during the cure process, the UT electrical signals being generated by a UT scanning system based on UT waves reflected from within a part being cured in the cure process, wherein the UT scanning system is disposed inside of a vessel and generates UT waves that pass out of a transducer head of a UT transducer of the UT scanning system, pass into the part, the part being in contact with the mold or with a couplant that couples the mold with the part, wherein UT waves reflected from within the part are incident on the transducer head, the UT transducer converting the UT waves that are incident on the transducer head into the UT electrical signals, and wherein the vessel is configured to be resistant to at least one of a high temperature and a high pressure of a chamber in which parts are cured, the vessel being configured to be placed inside of the chamber.

20. The computer program of claim 19, wherein the computer program further comprises:
a second set of computer instructions for performing a cure process control algorithm that causes the processor to send one or more commands to a controller of the chamber to cause the controller to adjust one or more parameters of the cure process based on results obtained by the first set of instructions.

* * * * *